(12) United States Patent
Lortz

(10) Patent No.: US 6,694,378 B1
(45) Date of Patent: Feb. 17, 2004

(54) EXTENSION OF DEVICE DRIVER OBJECTS

(75) Inventor: Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/218,919

(22) Filed: Dec. 22, 1998

(51) Int. Cl.$^7$ .............................................. G06F 13/10
(52) U.S. Cl. ...................................... 709/321; 709/328
(58) Field of Search ................................ 709/315, 316, 709/321, 327, 331, 332, 328

(56) References Cited

U.S. PATENT DOCUMENTS 5,970,252 A * 10/1999 Buxton et al. .............. 717/166
6,108,661 A *  8/2000 Caron et al. ................ 707/102
6,243,764 B1 *  6/2001 Leach et al. ................ 709/316

OTHER PUBLICATIONS

Bryan Walters, Mastering OLE 2 1995, pp. 15–17, 22–24 and 169–170.*

* cited by examiner

*Primary Examiner*—John Follansbee
*Assistant Examiner*—The Thanh Ho
(74) *Attorney, Agent, or Firm*—Schwegman, Lundberg, Woessner & Kluth, P.A.

(57) ABSTRACT

Extending driver objects, such as device driver objects. In one embodiment, a system including a driver object, an auto-aggregator object, and a driver extension object. The driver object has a set of at least one standard interface. The auto-aggregator object is aggregated to the driver object by a blind aggregation mechanism. The driver extension object is aggregated to the driver object by an auto-aggregation mechanism invoked by the auto-aggregator object to provide a custom interface for the driver object. In another embodiment, an aggregation map is used to map the driver object to the driver extension object.

15 Claims, 2 Drawing Sheets

EXTENSION OF DEVICE DRIVER OBJECTS

FIELD OF THE INVENTION

This invention relates generally to device driver software components (objects), and more particularly to extending such objects with new capabilities.

BACKGROUND OF THE INVENTION

Operating system and device driver vendors currently provide standard device drivers enabling application programs to control the operation of computer peripherals. However, the software components, or objects, comprising the driver usually have limited extensibility. For example, a driver object may only be able to expose to other objects and application programs a standard predefined interface.

Object architectures such as Microsoft Corp.'s Component Object Model (COM) sometimes provide a mechanism by which these objects can be extended with custom interfaces. However, this usually entails modifying the original driver object itself, so that it knows to expose a desired custom interface. Thus, it is generally not possible for third parties to add additional custom software interfaces for a driver without modifying the driver's code in some way.

Thus, clients wishing to use custom interfaces for a particular device that are not part of the original driver or its framework must have some ad hoc mechanism to find objects implementing those interfaces for the desired device. For these and other reasons, there is a need for the present invention.

SUMMARY OF THE INVENTION

The invention provides for extending driver objects. In one embodiment, a system includes a driver object, an auto-aggregator object, and a driver extension object. The driver object has a set of at least one standard interface. The auto-aggregator object is aggregated to the driver object by a blind aggregation mechanism. The driver extension object is aggregated to the driver object by an auto-aggregation mechanism invoked by the auto-aggregator object to provide a custom interface for the driver object. In another embodiment, an aggregation map is used to map an interface identifier to a driver extension class.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, throughout this document, terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
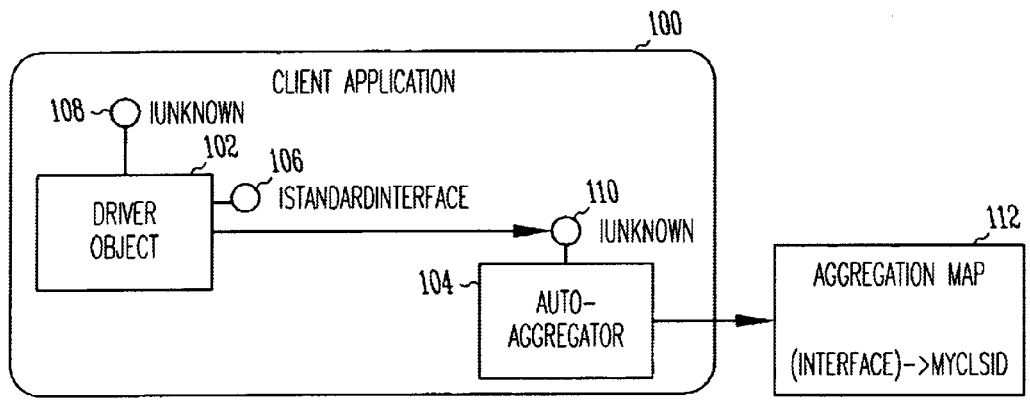
FIG. 1 and FIG. 2 show block diagrams of a system according to one embodiment of the invention.
Figure 2:
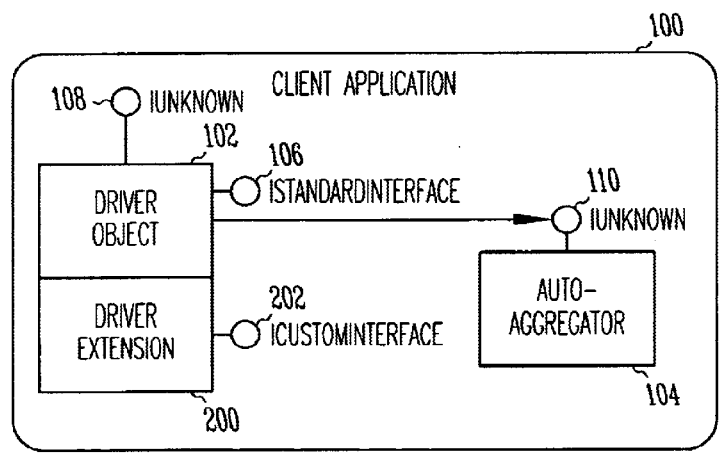

Referring first to FIGS. 1 and 2, a system according to an embodiment of the invention is shown. In FIG. 1, a diagram of a client application 100 having a driver object 102 and an auto-aggregator object 104 is shown, before a driver extension object is aggregated to the driver object 102. The client application in one embodiment is a computer program including a collection of machine-executable instructions executable on a processor and organized into different software components, or, objects, as known within the art. Each of the objects 102 and 104 is in one embodiment an object in accordance with the Component Object Model (COM) architecture provided by Microsoft Corp. for versions of its Microsoft Windows operating system; the invention is not so limited, however.

The driver object 102 is an object in one embodiment that relates to device-specific software used to provide an Application Programming Interface (API) or a control interface for a device. The invention is not so limited, however. For example, in other embodiments of the invention, the term "driver object" is inclusive of any arbitrary object.

The driver object 102 includes a standard interface 106, which in COM parlance is called "IStandardInterface." This is an interface that provides the ability for other objects to communicate with the driver object 102. The driver object 102 differs from objects known in the prior art in that it is modified to blind aggregate the auto-aggregator object 104. Blind aggregation is a term known in the art, and is provided by mechanisms within architectures such as COM. Blind aggregations means that the driver 102 knowingly aggregates the auto-aggregator object 104 component, and blindly forwards all query interface requests for unknown interfaces thereto. The term unknown interfaces refers to interfaces not known by the driver object 102—that is, not equal to its standard interfaces 106.

Thus, any interface request of the driver object 102 that does not match one of the standard interfaces 106 is forwarded to the auto-aggregator object 104. In other words, the unknown interfaces are passed along to the auto-aggregator 104, via a QueryInterface call on the unknown interface 110 of the auto-aggregator object 104 (known in COM as "IUnknown").

Instantiation of the driver object 102 thus yields the object 102 with the standard interface 106 and the unknown interface 108. When a query is made of an interface not part of the standard interface 106, the auto-aggregator object 104 is instantiated and blind-aggregated to the driver object 102. The auto-aggregator object 104 then is asked for the unknown interfaces.

To provide any unknown interfaces, the auto-aggregator object 104 instantiates and auto-aggregates a driver extension object (not shown in FIG. 1) to the driver object 102. To accomplish this, the auto-aggregator object 104 looks in an aggregation map 112, which maps a set of interface identifiers to a corresponding set of driver extension classes, such that an object of this class can be instantiated. The driver extension classes can be identifiable by a CLSID, GUID, Moniker, or ProgID, as known within the art. The invention is not so limited, however; any interface identifier can be used. The map 112 may be a table stored in the memory of a computer, although the invention is not so limited. In one embodiment, information as to where the class for this object resides is stored in a Registry file, as known within the art. The instantiated driver extension object then provides a custom interface that is responsive to the interface query previously unknown by the driver object 102.

The result of the aggregation of a driver extension object to the driver object is shown in FIG. 2. The driver object 102 still implements the standard interfaces 106, and it still passes unknown interface queries to the auto-aggregator object 104. However, a driver extension object 200 has now been auto-aggregated by the auto-aggregator object 104 to the driver object 102.

The driver extension object 200 has a custom interface 202 that provides the interface that was previously requested of but unknown to the driver object 102. In COM parlance, the custom interface 202 is known as "ICustomInterface".

The auto-aggregator 104 is able to auto-aggregate the driver extension object 200 to the driver object 102 via an auto-aggregation mechanism, as is known within the art and as present in architectures such as COM. (In another embodiment, the auto-aggregator caches a pointer to the aggregated custom interface and returns that cached pointer in response to subsequent requests for the same custom interface.) The auto-aggregator object queries the newly created driver extension object for the desired interface and returns the result as its own QueryInterface return value, in one embodiment of the invention. Auto-aggregation refers to the ability to aggregate one object with an already instantiated object. Note that although only one driver extension object 200 is shown in FIG. 2, the invention is not so limited. Insofar as other unknown interface queries are made to the driver 102 specifying interfaces that have counterparts in the aggregation map (not shown in FIG. 2), other driver extension objects may also be aggregated to the driver object 102.

As has been described in relation to FIG. 1 and FIG. 2, at least some embodiments of the invention provide advantages over the prior art. For example, a preexisting driver object only needs to have its specific code modified insofar as to pass along unknown interface queries to an auto-aggregator object that it instantiates. The object does not necessarily have to be modified in any other way. Once such a driver object has been so modified, however, different interfaces can be easily added to the driver object via new driver extension objects. To add the interfaces, an entry is only needed to be added into the aggregation map mapping the new interface and the driver object to the class of the new driver extension object. When this interface is then queried for, the auto-aggregator object instantiates the new driver extension object providing the interface and auto-aggregates it to the driver object.

Figure 3:
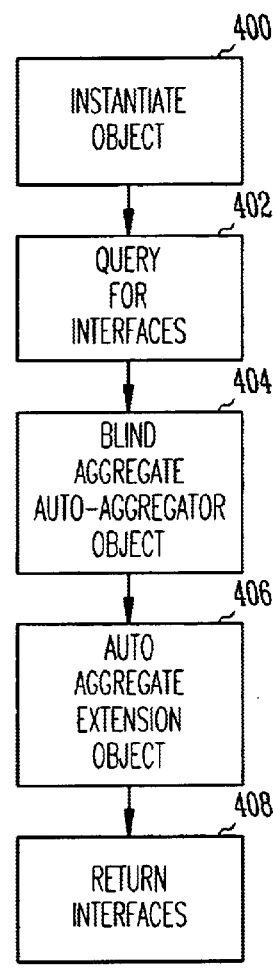
FIG. 3 shows a flowchart of a method according to an embodiment of the invention; and, FIG. 4 shows a diagram of a computer in conjunction with which embodiments of the invention may be practiced.

Referring next to FIG. 3, a method in accordance with an embodiment of the invention is shown. The method is desirably realized at least in part as one or more programs running on a computer—that is, as a program executed from a computer-readable medium such as a memory by a processor of a computer. The programs are desirably storable on a computer (or machine)readable medium such as a floppy disk or a CD-ROM, for distribution and installation and execution on another computer. Each program desirably includes machine-executable instructions, as known within the art.

In 400, a driver object, such as has been described, is instantiated. In 402, a query is made to the driver object for all of its interfaces, including any standard interfaces and any nonstandard or unknown interfaces. To determine the non-standard, unknown interfaces, the driver object in 404 instantiates an auto-aggregator object and blind aggregates the object to itself, as has been described. In turn, the driver object in 406 looks up all the interfaces for the driver object in a table or a map, and instantiates the driver extension objects found corresponding to the driver object in the table. The driver object in 406 also auto-aggregates these driver objects to the driver object. The driver extension objects have custom interfaces for the driver object, in effect extending the standard interfaces of the driver object. Finally, in 408, in response to the query of 402, the auto-aggregator queries the driver extension object for the originally requested non-standard interface and returns that pointer to the original caller.

Figure 4:
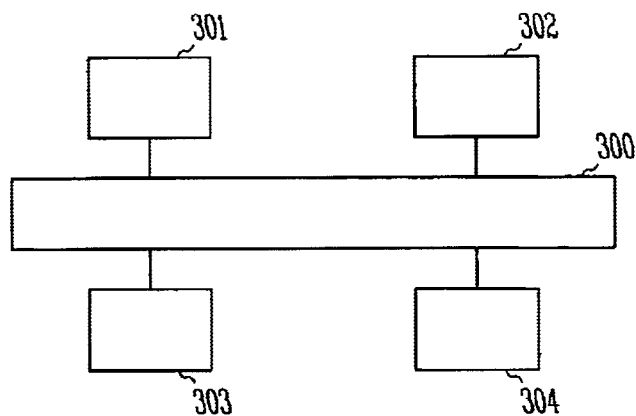

Referring finally to FIG. 4, a diagram of a computer in conjunction with which embodiments of the invention may be practiced is shown. The computer comprises bus 300, keyboard interface 301, external memory 302, mass storage device 303 and processor 304. Bus 300 can be a single bus or a combination of multiple buses. Bus 300 can also comprise combinations of any buses. Bus 300 provides communication links between components in the computer. Keyboard controller 301 can be a dedicated device or can reside in another device such as a bus controller or other controller. Keyboard controller 301 allows coupling of a keyboard to the computer system and transmits signals from a keyboard to the computer system. External memory 302 can comprise a dynamic random access memory (DRAM) device, a static random access memory (SRAM) device, or other memory devices. External memory 302 stores information from mass storage device 303 and processor 304 for use by processor 304. Mass storage device 303 can be a hard disk drive, a floppy disk drive, a CD-ROM device, or a flash memory device. Mass storage device 304 provides information to external memory 302. Processor 304 can be a microprocessor and may be capable of decoding and executing a computer program such as the client application program described above, or an operating system with instructions from multiple instruction sets.

Extending driver objects has been described. Although specific embodiments have been illustrated and described herein, it will be appreciated by those of ordinary skill in the art that any arrangement which is calculated to achieve the same purpose may be substituted for the specific embodiments shown. For example, while one embodiment has been described with respect to objects in accordance with the COM architecture; the invention is not so limited. This application is intended to cover any adaptations or variations of the present invention. For example, the invention is amenable to applications under other object models and architectures. Therefore, it is manifestly intended that this invention be limited only by the following claims and equivalents thereof.

I claim:

1. A system comprising:
   a driver object having a set of at least one standard interface;
   an auto-aggregator object aggregated to the driver object by a blind aggregation mechanism; and,
   a driver extension object aggregated to the driver object by an auto-aggregation mechanism invoked by the auto-aggregator object to provide a custom interface for the driver object.

2. The system of claim 1, further comprising an aggregation map to map an interface identifier of the driver object to the driver extension object.

3. The system of claim 2, wherein the interface identifier is selected from the group essentially consisting of: CLSID, GUID, Moniker, and ProgID.

4. The system of claim 1, wherein each of the driver object, the auto-aggregator object, and the driver extension object comprises a Component Object Model (COM) object.

5. The system of claim 4, wherein the blind aggregation mechanism is provided by the Component Object Model (COM).

6. The system of claim 4, wherein the auto-aggregation mechanism is provided by the Component Object Model (COM).

7. A method comprising:
   querying a driver object for a non-standard interface;
   blind aggregating an auto-aggregator object to the driver object by a blind aggregation mechanism; and,
   auto aggregating a driver extension object to the driver object by an auto-aggregation mechanism invoked by the auto-aggregator object to provide a custom interface for the driver object.

8. The method of claim 7, wherein blind aggregating the auto-aggregator object comprises first instantiating the auto-aggregator object.

9. The method of claim 7, wherein auto aggregating the driver extension object comprises looking up the driver extension object by the auto-aggregator object in a table for the driver object.

10. The method of claim 7, wherein auto aggregating the driver extension object comprises first instantiating the driver extension object.

11. The method of claim 7, wherein each of the driver object, the auto-aggregator object, and the driver extension object comprises a Component Object Model (COM) object.

12. A machine-readable medium storing processor instructions for execution by a processor to perform a method comprising:
   querying a driver object for interfaces of the driver object; and,
   receiving the interfaces of the driver object comprising:
      standard interfaces of the driver object;
      custom interfaces for the driver object as returned by a driver extension object auto-aggregated to the driver object by an auto-aggregator object blind aggregated to the driver object.

13. The machine-readable medium of claim 12, wherein the method also initially comprises instantiating the driver object.

14. The machine-readable medium of claim 12, wherein each of the driver object, the auto-aggregator object, and the driver extension object comprises a Component Object Model (COM) object.

15. The machine-readable medium of claim 12, wherein the medium is selected from the group essentially consisting of: a floppy disk, a CD-ROM.

* * * * *